(12) United States Patent
Bloemker

(10) Patent No.: US 11,524,195 B2
(45) Date of Patent: Dec. 13, 2022

(54) FIRE FIGHTING TRAINING UNIT

(71) Applicant: MAX FIRE TRAINING, INC., Godfrey, IL (US)

(72) Inventor: Shawn C. Bloemker, Godfrey, IL (US)

(*) Notice: Subject to any disclaimer, the term of this patent is extended or adjusted under 35 U.S.C. 154(b) by 510 days.

(21) Appl. No.: 16/665,295

(22) Filed: Oct. 28, 2019

(65) Prior Publication Data
US 2020/0398094 A1 Dec. 24, 2020

Related U.S. Application Data

(60) Provisional application No. 62/751,574, filed on Oct. 27, 2018.

(51) Int. Cl.
| G09B 19/00 | (2006.01) |
|---|---|
| A62C 99/00 | (2010.01) |
| G09B 25/04 | (2006.01) |

(52) U.S. Cl.
CPC .......... *A62C 99/0081* (2013.01); *G09B 25/04* (2013.01)

(58) Field of Classification Search
CPC ................................. G09B 19/00; G09B 19/24
USPC .......................................................... 434/226
See application file for complete search history.

(56) References Cited

U.S. PATENT DOCUMENTS

| 2,118,338 | A | | 5/1938 | Bolhuis | |
|---|---|---|---|---|---|
| 2,635,359 | A | | 4/1953 | Broscious | |
| 3,924,376 | A | | 12/1975 | Tsurumi | |
| 4,526,548 | A | * | 7/1985 | Livingston | G09B 19/00 |
| | | | | | 434/226 |
| 5,167,560 | A | | 12/1992 | Lubiniecki | |
| 5,173,052 | A | * | 12/1992 | Duncan, Jr. | G09B 19/00 |
| | | | | | 296/168 |
| 5,203,707 | A | * | 4/1993 | Musto | G09B 19/00 |
| | | | | | 434/226 |
| 5,226,818 | A | * | 7/1993 | Feiock | A62C 99/0081 |
| | | | | | 434/226 |

(Continued)

FOREIGN PATENT DOCUMENTS

| GB | 2294572 | 5/1996 |
|---|---|---|
| GB | 2339955 | 2/2000 |
| NL | 1003574 | 6/1997 |

OTHER PUBLICATIONS http://www.cfbt-us.com/pdfs/revised_dh_plans_v3.pdf Copyright unknown but admitted prior art.

(Continued)

*Primary Examiner* — Kurt Fernstrom
(74) *Attorney, Agent, or Firm* — Grace J. Fishel

(57) ABSTRACT

A fire fighting training unit formed of steel plate with a stackable first story, second story and a roof mounted at eye level on a portable mobile stand for use with a thermal imaging camera. The roof is stackable on either the first story or second story. Each of the first and second stories has a hallway formed by divider panels separating first and second burn units, said hallways simulating a stairway when the first and second stories are stacked. Apertures in the divider panels have a sliding valve for controlling airflow. A garage with a base and a stackable roof is attached to the first story by a breezeway with a rotary valve in a sleeve for controlling airflow between the first story and the garage. The roofs having an aperture and the first and second burn units of the first and second stories have windows with latched closures.

18 Claims, 15 Drawing Sheets

(56) References Cited

U.S. PATENT DOCUMENTS

| | | | |
|---|---|---|---|
| 5,862,931 A | 1/1999 | Cox | |
| 5,927,990 A | 7/1999 | Welch et al. | |
| 6,179,620 B1 | 1/2001 | Schmid | |
| 6,524,107 B1 | 2/2003 | Brown | |
| 6,799,975 B1* | 10/2004 | Dunn | G09B 19/00 434/226 |
| 6,889,473 B2 | 5/2005 | Westra | |
| 7,074,043 B1 | 7/2006 | Jacobson | |
| 7,262,747 B2* | 8/2007 | Ebersole | G09B 19/00 345/9 |
| 7,493,731 B2 | 2/2009 | Zhang | |
| 7,823,357 B2 | 11/2010 | Westra | |
| 7,901,212 B2* | 3/2011 | Quinn | A62C 99/0081 434/226 |
| 8,048,505 B1 | 11/2011 | Reaney | |
| 8,622,744 B2* | 1/2014 | Lumry | G09B 25/02 434/226 |
| 9,573,009 B2* | 2/2017 | Bloemker | A62C 99/0081 |
| 9,707,424 B2 | 7/2017 | Bloemker | |
| 10,376,726 B2 | 8/2019 | Bloemker | |
| 2003/0198923 A1* | 10/2003 | Westra | E04H 3/00 434/226 |
| 2005/0233289 A1* | 10/2005 | Hoglund | G09B 19/00 434/226 |
| 2008/0029527 A1 | 2/2008 | Woinarski | |
| 2008/0090214 A1* | 4/2008 | D'Anneo | G09B 19/00 434/226 |
| 2008/0239638 A1 | 10/2008 | Chinuki et al. | |
| 2009/0159592 A1 | 6/2009 | Vitalis et al. | |
| 2009/0188188 A1 | 7/2009 | Rivet | |
| 2014/0308633 A1* | 10/2014 | Russell | G09B 19/00 434/226 |
| 2015/0079559 A1* | 3/2015 | Blackburn | G09B 19/00 434/226 |
| 2015/0132728 A1* | 5/2015 | Harding | A62C 99/0081 434/226 |
| 2015/0379883 A1* | 12/2015 | King | G09B 19/00 434/226 |
| 2019/0308049 A1* | 10/2019 | O'Donnell | G09B 19/003 |

OTHER PUBLICATIONS

"Burning Down the (Dolls) House: Small Scale Compartment Fire Demonstrations," CFBT, http://web.archive.org/web/20110924231620/http://www.cfbt-us.com/pdfs/revised_dh_plans_v3.pdf, Sep. 24, 2011.

"Live Fire Training Fatalities," Ed Hartin, http://web.archive.org/web/20101022052629/http://cfbt-us.com/wordpress/?tag=add-new-tag, Oct. 22, 2010.

"PPE in Flashover Simulators and Burn Buildings," Jeffrey O, and Grace G. Stull, https://firerecruit.com/articles/897721-PPE-in-flashover-simulators-and-burn-buildings, Oct. 21, 2010.

* cited by examiner

FIRE FIGHTING TRAINING UNIT

BACKGROUND OF THE INVENTION

Field of the Invention

The present invention relates to fire fighting training unit that can be set up as a one story burn or a two story burn and mounts directly to a portable metal stand allowing the unit to be moved between and during training sessions and stored much easier than large scale training units.

Brief Description of the Prior Art

Fire fighters must be able to make life and death decisions in rapidly changing environments. To do that effectively they need to be able to not only recognize signs of changing environments but also recognize what factors cause the environment to change. Although classroom training is a great way to teach fire fighters the basics of fire behavior, such as, definitions and what they need to be looking for in live events, actually seeing those conditions first hand can be a much more impactful way to learn. But most fire departments and colleges with fire science programs are unable to properly train with live fire because of the cost and space needed for live burns, and even with the benefits of burn towers and similar structures, it is hard to safely demonstrate critical stages of a fire such as, flashovers, backdrafts and smoke explosions.

BRIEF SUMMARY OF THE INVENTION

In view of the above, it is an object of the present invention to provide a portable training unit that will fit in the back of a full size truck bed which allows it to be easily transported from station to station or to public education events. It is another object to provide a training unit that provides multiple fire behavior and thermal imaging learning objectives in a controlled interactive learning environment. It is also an object to provide a training unit that can be set up as a one story burns or two story burn. Other objects and features of the invention will be in part apparent and in part pointed out hereinafter.

In accordance with the invention, a fire fighting training unit has one or more of the following features: stackable first and second story, at least two burn chambers separated by a hallway in each story, a sliding door valve for controlling airflow between the hallway and the burn chambers, a garage attached with a breezeway to the first story, a sleeve in the breezeway with a rotary valve for controlling airflow between the garage and the first story, etc.

The invention summarized above comprises the constructions hereinafter described, the scope of the invention being indicated by the subjoined claims.

BRIEF DESCRIPTION OF THE SEVERAL VIEWS OF THE DRAWINGS

In the accompanying drawings, in which one of various possible embodiments of the invention are illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
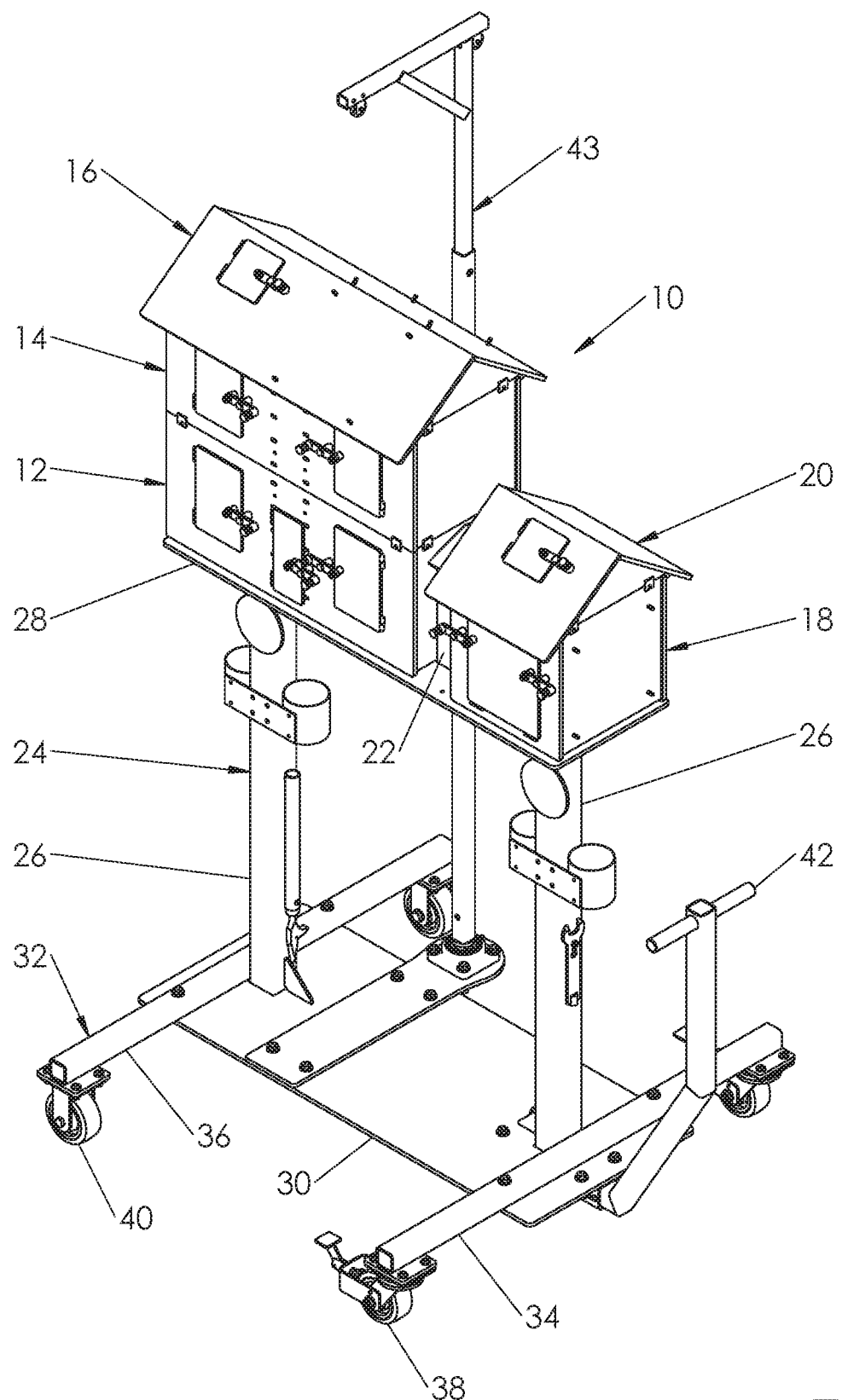
FIG. 1 is a perspective view of a fire fighting training unit in accordance with the present invention mounted on a portable metal stand.
Figure 2:
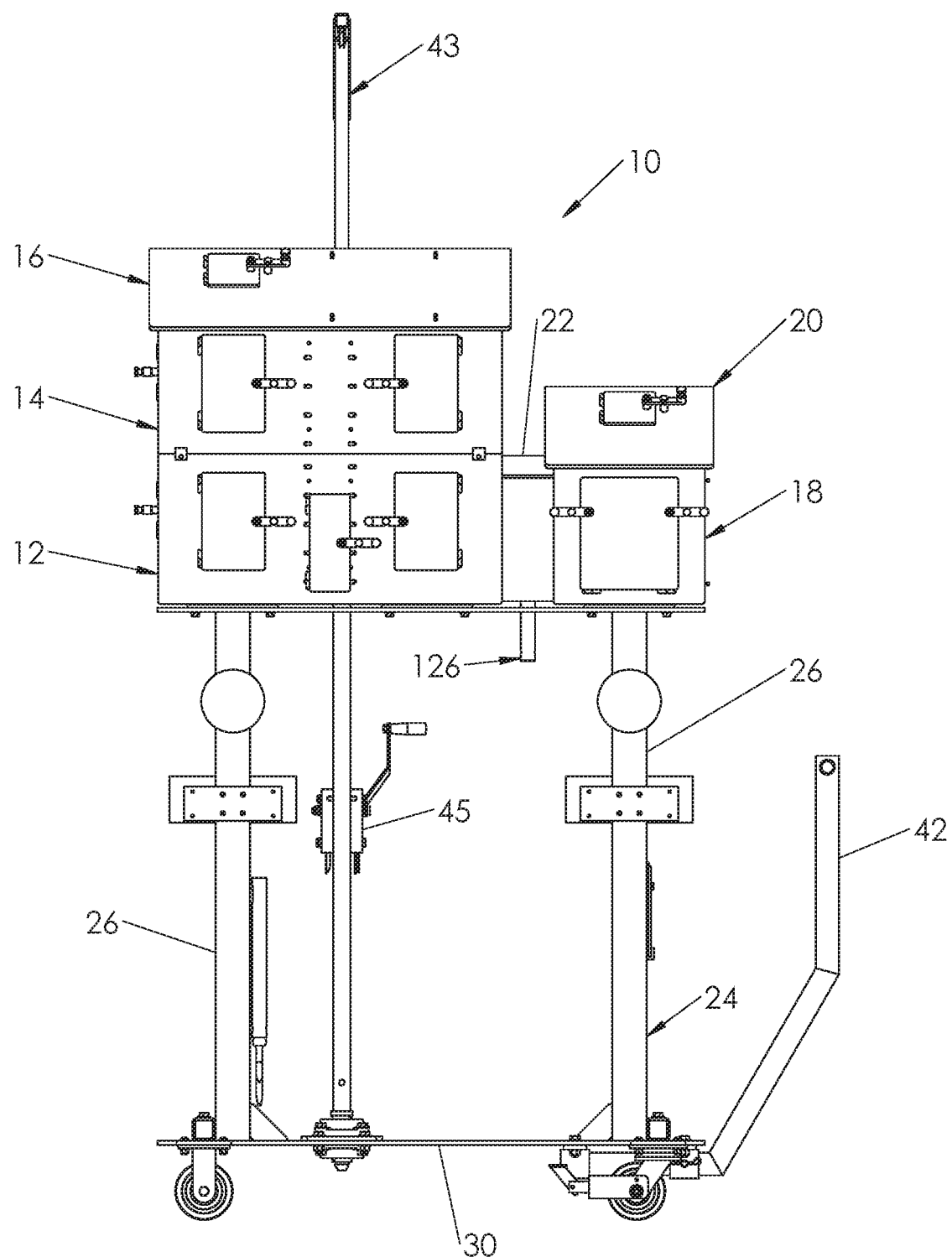
FIG. 2 is a front elevation of the "A" side of the fire fighting training unit shown in FIG. 1.
Figure 3:
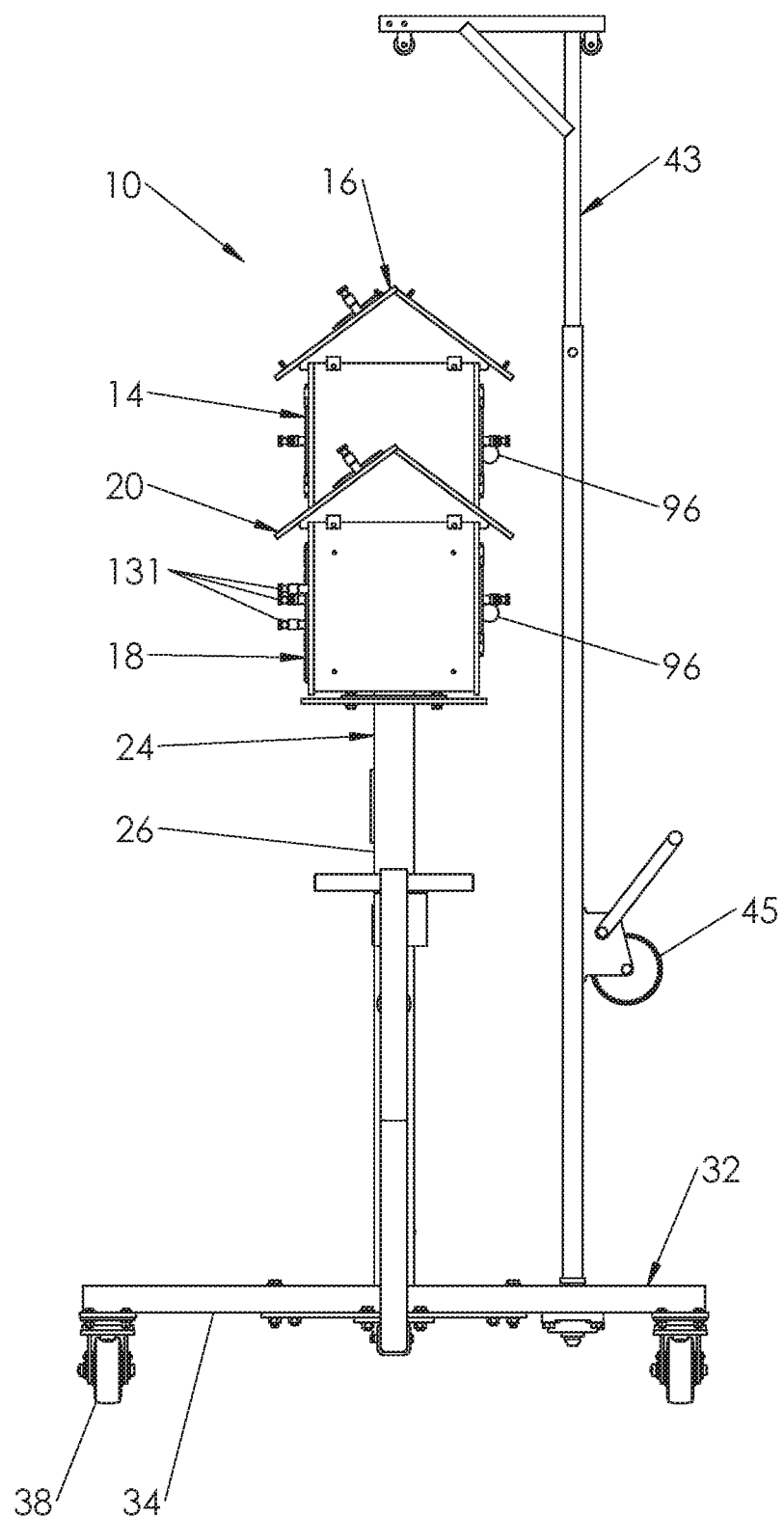
FIG. 3 is right side elevation of the "D" side of the structure shown in FIG. 1.
Figure 4:
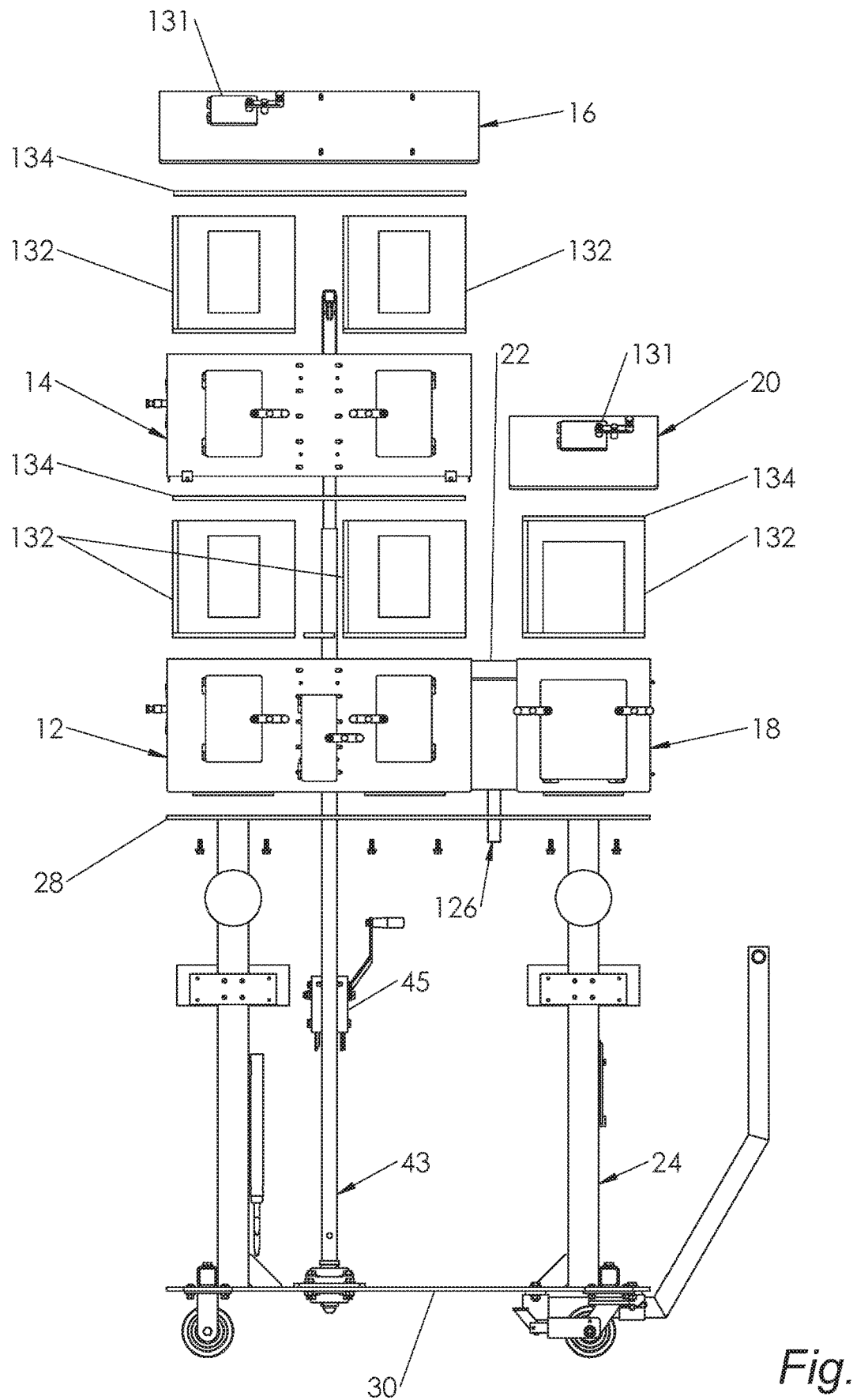
FIG. 4 is an exploded view of the fire fighting training unit as shown in FIG. 2.
Figure 5:
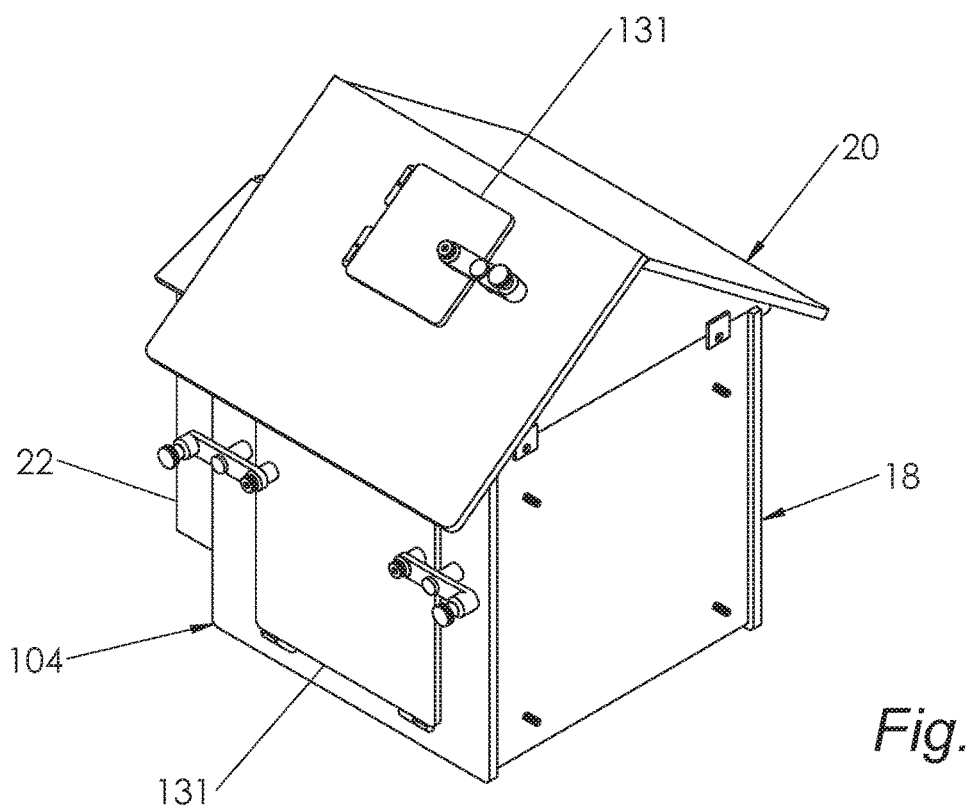
FIG. 5 is a perspective view of a garage end of the fire fighting unit with an attached breezeway.
Figure 6:
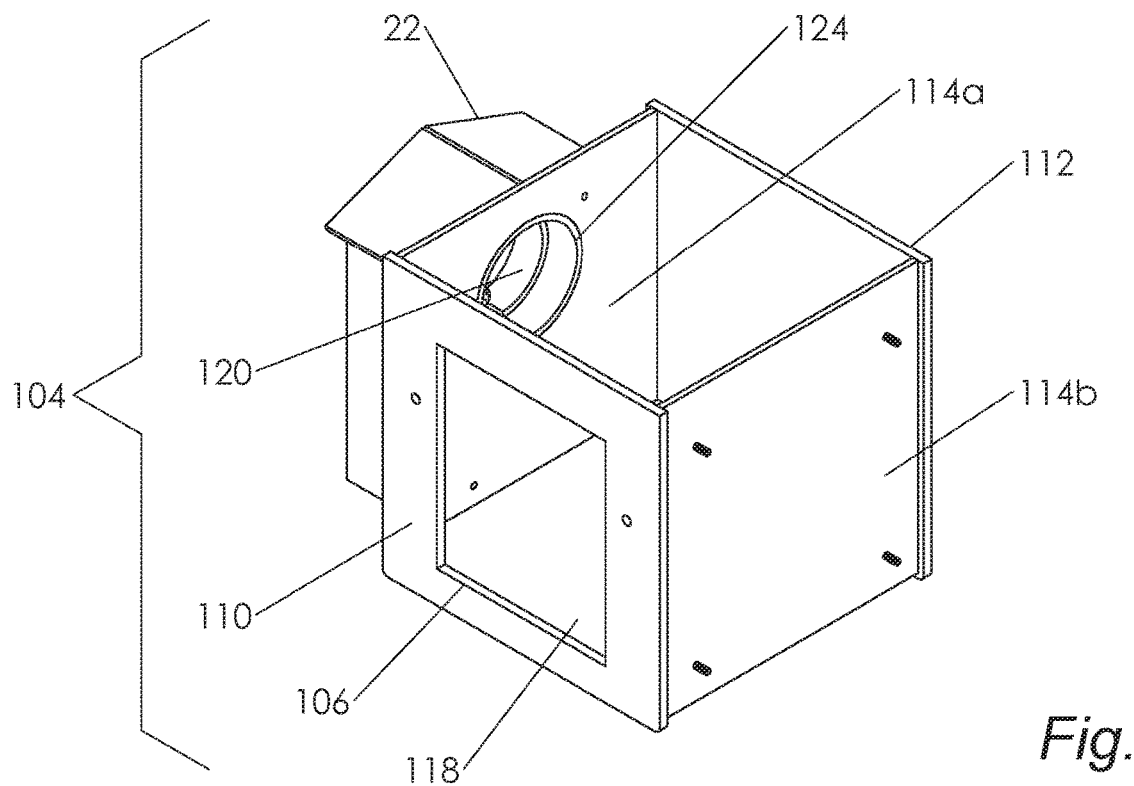
FIG. 6 is a perspective view of a garage base with a roof removed.
Figure 7:
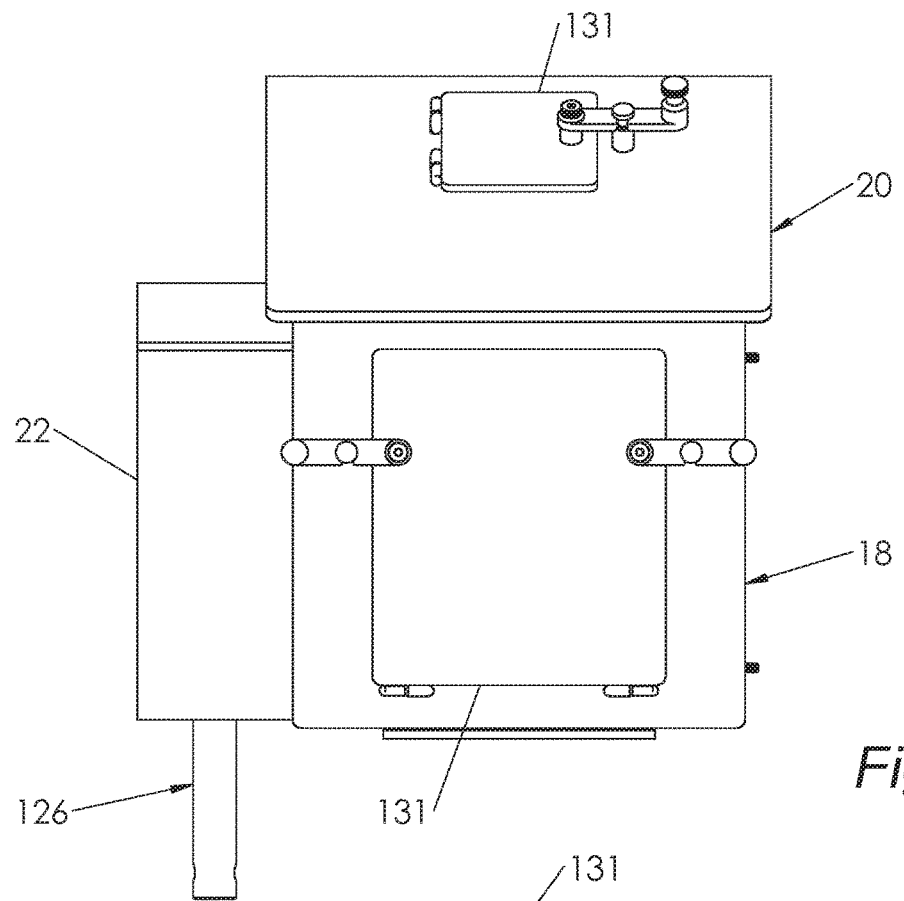
FIG. 7 is a front elevation of the "A" side of the garage with an attached breezeway.
Figure 21:
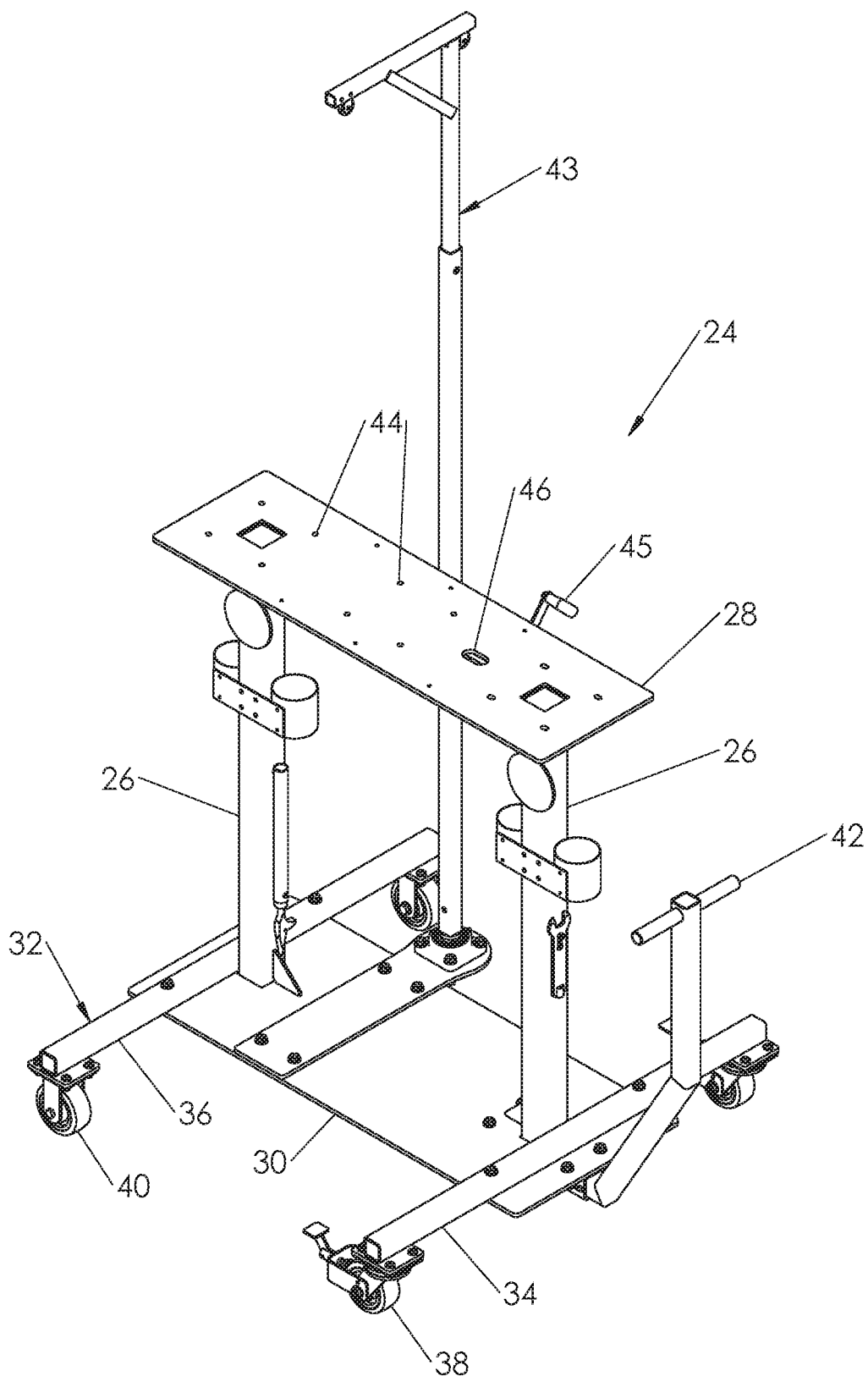

Referring to the drawings by reference character, reference numeral 10 refers to a fire fighting training unit in accordance with the present invention. In major part, unit 10 comprises a first story 12, second story 14 and a roof 16. A garage 18 with a roof 20 is attached by a breezeway 22 to the D side of first story 12. Fire fighters generally refer to the front of a fire building as the "A" side, usually the front door facing the street or address side, but may be facing the a parking area. The other sides are labeled B (left) C (rear) and D (right). First story 12, second story 14 and roof 16 are stackable but are separate units. This facilitates loading the structure with burnable material and permits unit 10 to be used as a one story or two story burn unit. Roof 20 is also separate and stackable in garage 18 as more particularly described below. As seen in FIG. 1 unit 10 is mounted on a portable mobile stand 24 as shown in FIG. 21.

Portable mobile stand 24 in accordance with an embodiment of the present invention includes first and second posts 26, a top support plate 28, a bottom support plate 30 and a wheel assembly 32. First and second posts 26 are square in cross section and welded into apertures provided in top and bottom support plates 28, 30. Wheel assembly 32 includes a first cross member 34 and a second cross member 36 from which bottom support plate 30 is suspended. Swivel caster wheels 38 are provided at the ends of first cross member 34 and rigid caster wheels 40 are provided at the ends of second cross member 36. A gooseneck hitch 42 is welded to an underside of bottom support plate 30 by means of which portable mobile stand 24 with unit 10 weighing several thousand pounds may be towed. A lifting hoist 43 with a winch 45 is bolted to a top side of bottom support plate 30. Top support plate 28 includes apertures 44 for use in bolting first story 12 and garage 18 to the plate and an aperture 46 for use with a rotary valve more particularly described below. The walls and floor of first story 12, second story 14 and garage 18 and roofs 16, 20 are formed of steel plate such that unit 10 has considerable weight as mentioned above. To thermally isolate unit 10 from portable mobile stand 24, first story 12 and garage 18 are mounted on spacer feet 46 (FIG. 9) bolted through apertures 44 in top support plate 28.

Figure 12:
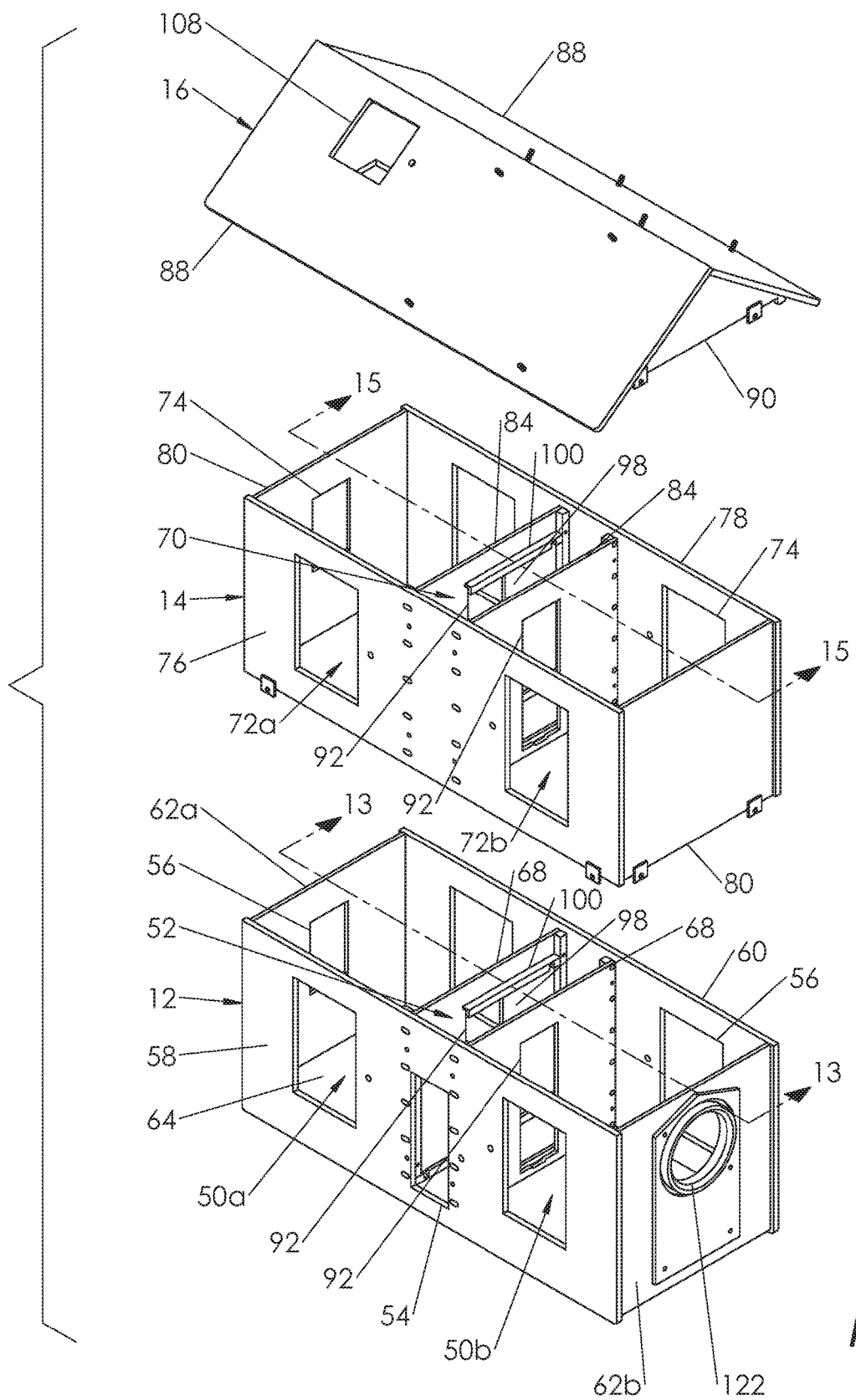
FIG. 12 the an exploded perspective view of the first story, second story and roof.
Figure 13:
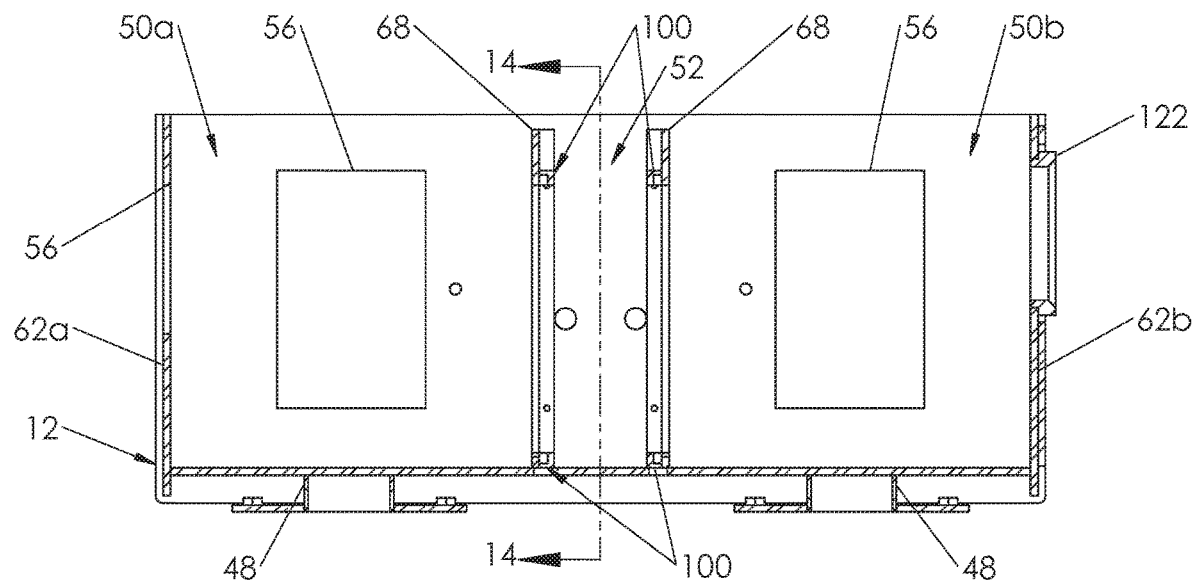
FIG. 13 is a sectional view of the first story taken along the plane of 13-13 in FIG. 12.

As best seen in FIG. 12, coordinated with FIGS. 13-16, first story 12 has two separate burn chambers 50a, 50b separated by a hallway 52. An outside door 54 opens to hallway 52 and windows 56 are provided along the A, B and C sides of burn chamber 50a and along the A and C sides of burn chamber 30b. First story 12 is formed with a front wall 58, back wall 60 and first and second end walls 62a, 62b. Divider walls 68 form hallway 52 aligned with outside door 54 and are spot welded to front and back walls 58, 60. With continuing reference to FIG. 12, second story 14 has a hallway 70 which aligns when stacked with hallway 52 of first story 12 to simulate a stairway. Second story 14 has two separate burn chambers 72a, 72b and windows 74 in each of burn chambers 72a, 72b. Like first story 12, second story 14 is formed with a front wall 76, a back wall 78, first and end walls 80 welded to a floor plate 82. With continued reference to FIG. 12, roof 16 includes an aperture 86 and is stackable on either first story 12 or second story 14. Roof 16 in the embodiment illustrated in the drawings, is formed in two panels 88 pitched at an angle from a central ridge with end gables 90. In both first story 12 and second story 14, there are doorways 92 in divider walls 68, 84, respectively, that open into hallways 52, 70.

A sliding door valve 94 operable with a push rod 96 from the C side of first and second stories 12, 14 may be used to open or close each of doorways 92. As seen in FIGS. 13-18, each sliding door valve 94 comprises a gate 98 may be slid in upper and lower tracks 100 attached on the hallway side of divider walls 68 in first story 12 and divider walls 84 in second story 14. A first end of push rod 96 is attached by a bracket 102 to gate 98 and a second end of push rod 96 passes through an aperture provided in back walls 60, 78 for that purpose. When pushrods 96 are pushed inward, gates 98 block airflow through doorways 92. As pushrods 96 are pulled outwardly, gates 98 selectively partially or fully unblock doorways 92.

Figure 8:
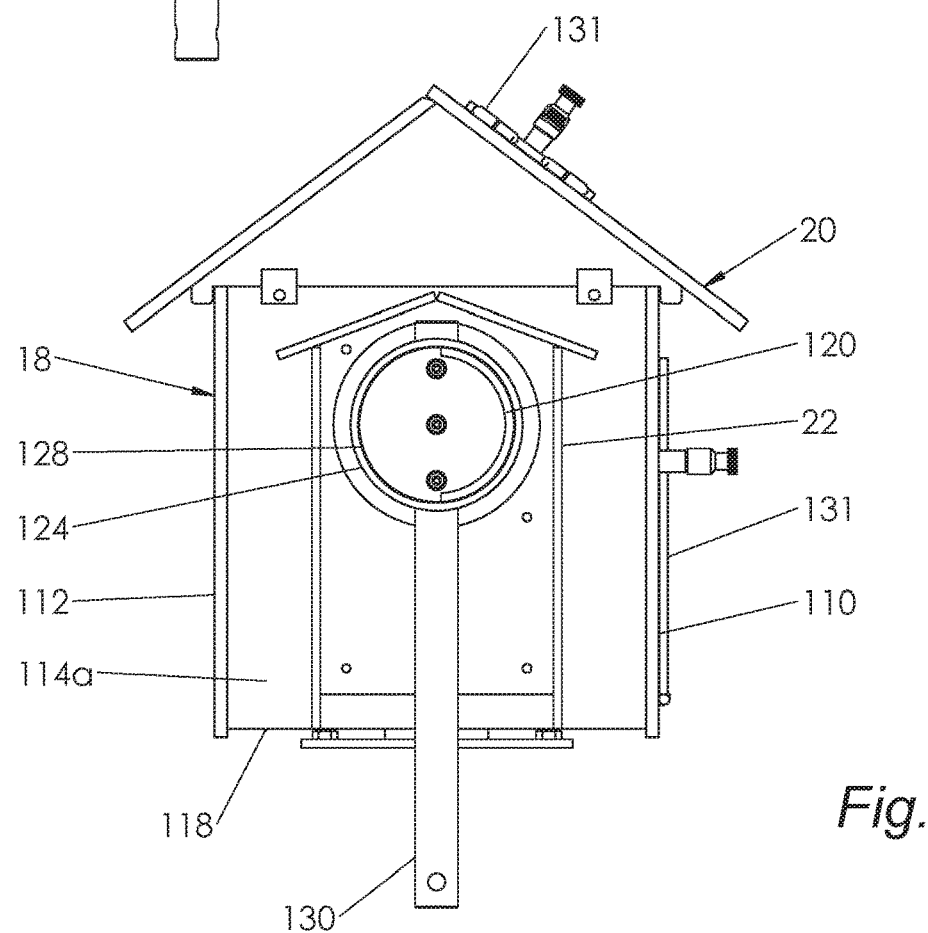
FIG. 8 is a left side elevation of the "B" side of the garage showing a rotary valve.
Figure 9:
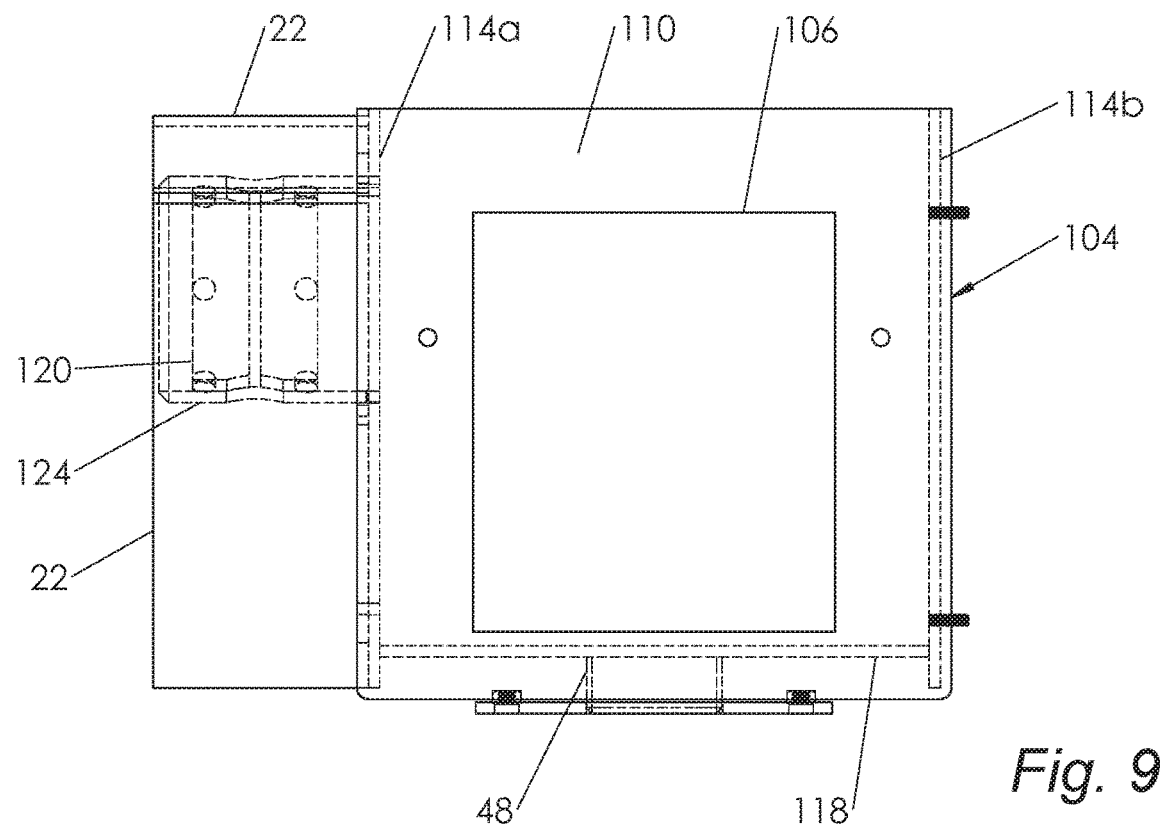
FIG. 9 is a sectional view taken along the plane of 9-9 in FIG. 6 showing a sleeve connecting the garage with a first story of the fire fighting unit in which the rotary valve is mounted.
Figure 10:
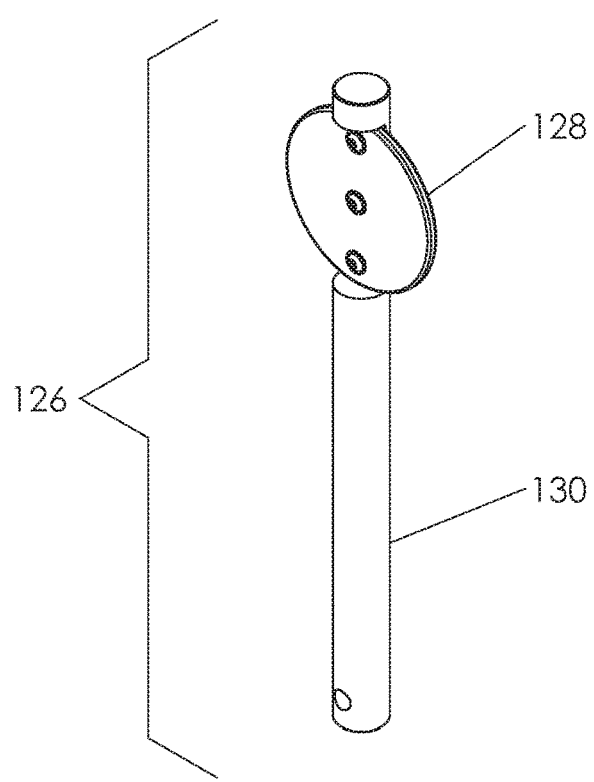
FIG. 10 is a perspective view of the rotary valve.
Figure 11:
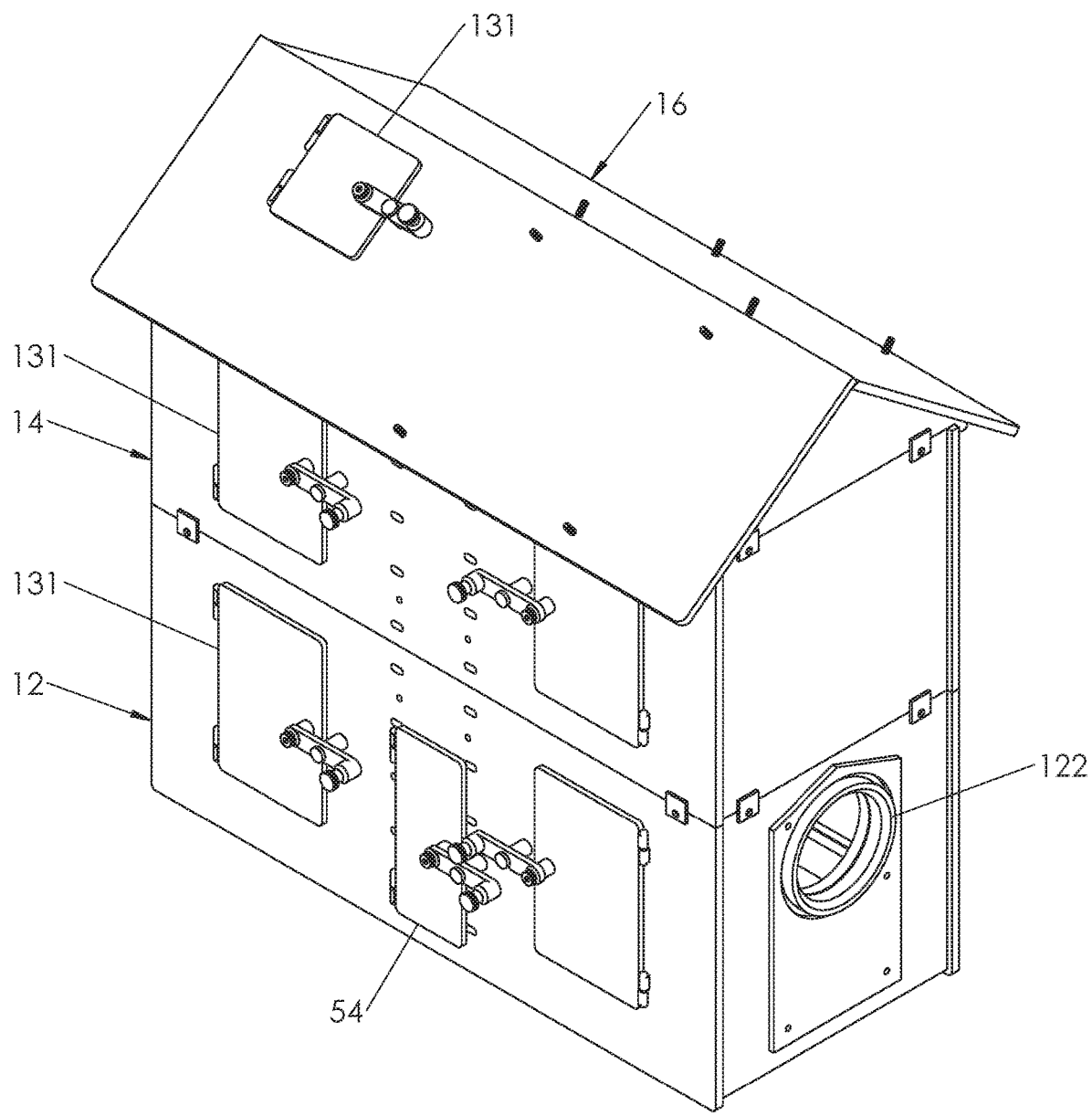
FIG. 11 is a perspective view of the first story and second story with the garage end removed.

As shown in FIGS. 5-10, garage 18 includes a garage base 104 covered by pitched roof 20. Garage base 104 has a garage door opening 106 and an aperture 108 in roof 20. More particularly, garage 18 has a front wall 110, back wall 112, and first and second end walls 114a, 114b welded to a floor plate 118. As best seen in FIG. 9, closed breezeway 22 connects garage 18 with the D side of first story 12. A sleeve 120 in breezeway 22 connects an aperture 122 in end wall 62b of first story 12 with an aperture 124 in end wall 114a of garage base 104. A rotary valve 126 as seen in FIGS. 8 and 10 is mounted in sleeve 120 thereby controlling airflow between garage 18 and first story 12. As shown in FIG. 8 and elsewhere, rotary valve 126 includes a transverse plug 128 which regulates flow through sleeve 120. Plug 128 is connected to a rotary shaft 130 which passes through the floor of closed breezeway and through aperture 46 in top support plate 28 of portable mobile stand 24 by which the transverse plug may be manipulated.

Outside door 54, windows 56, 74 and roof aperture 86 are outfitted with hinged closures 131 which may be latched closed. As with the main portion of unit 10, garage door opening 106 and aperture 108 in roof 20 are outfitted with hinged closures 131 which may be latched closed.

Figure 14:
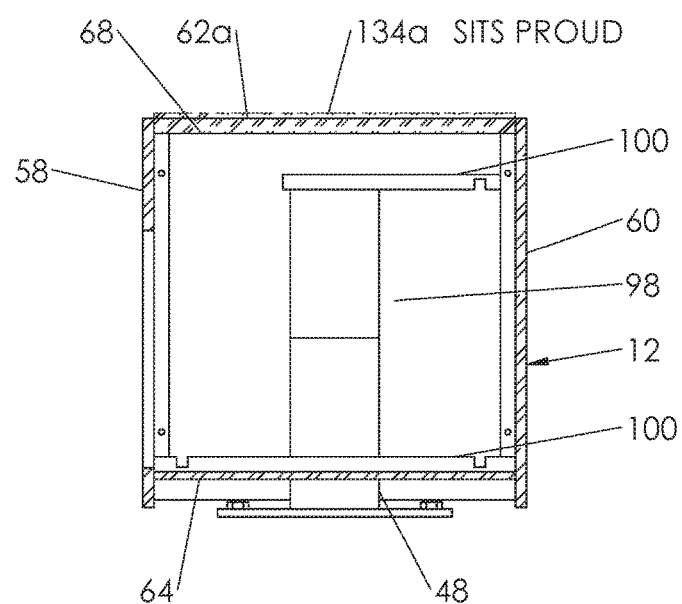
FIG. 14 is a sectional view taken along the plane of 14-14 in FIG. 13 showing a sliding door valve.
Figure 15:
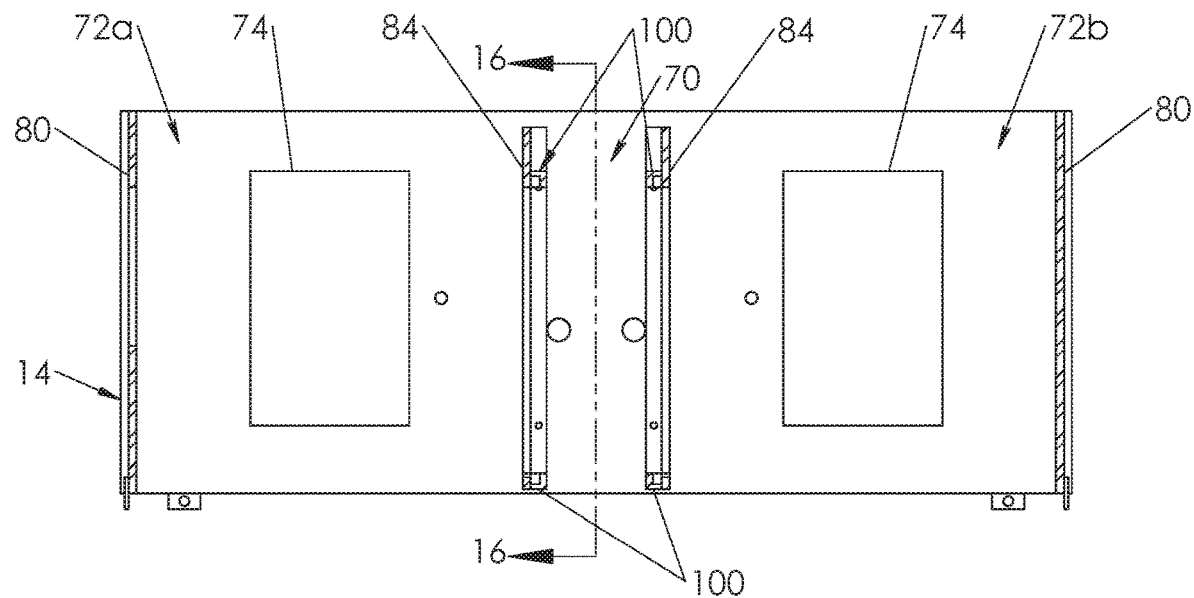
FIG. 15 is a sectional view of the second story taken along the plane of 15-15 in FIG. 12.
Figure 16:
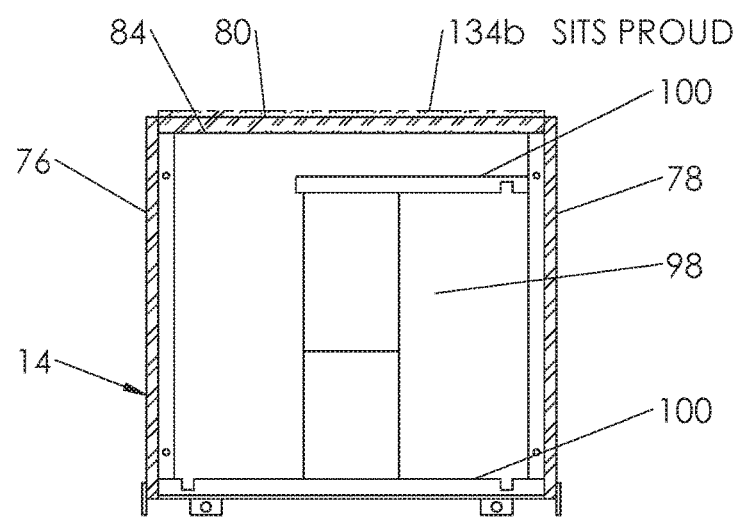
FIG. 16 is a sectional view taken along the plane of 16-16 in FIG. 15 showing a sliding door valve.
Figure 17:
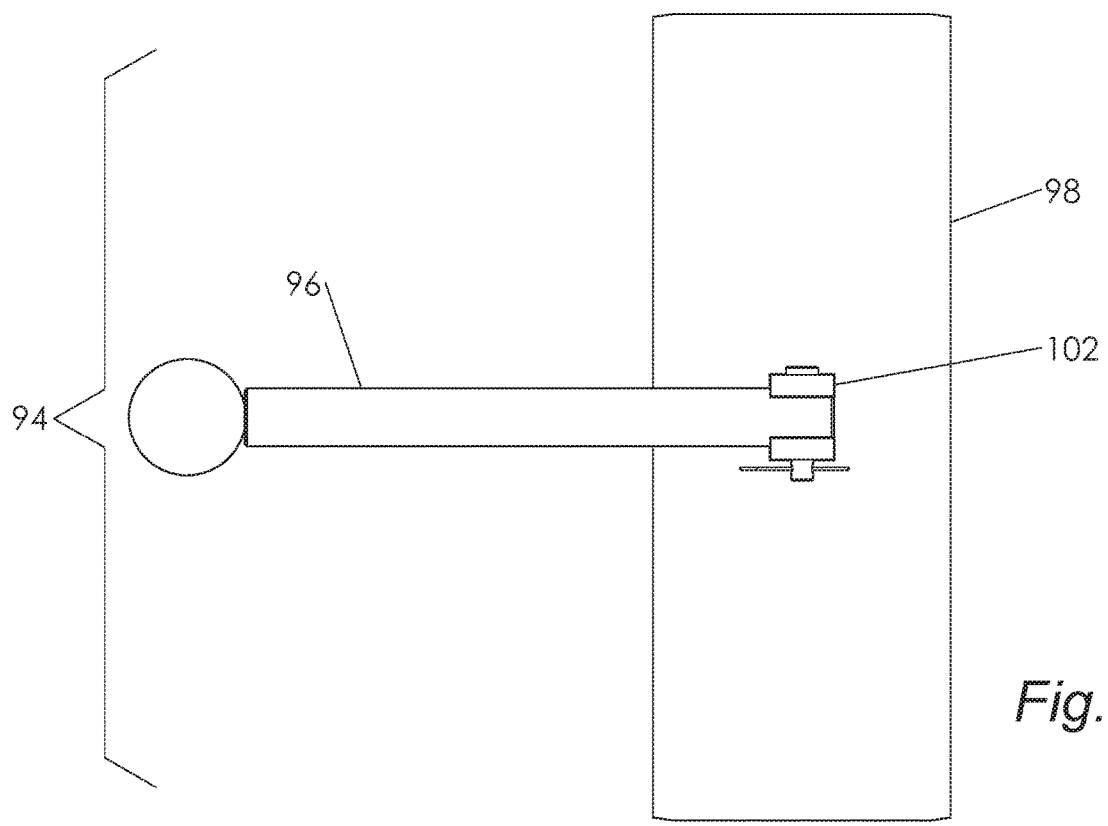
FIG. 17 is a side elevation of the sliding door valve which is operated by a push rod from the "C" side of the structure.
Figure 18:
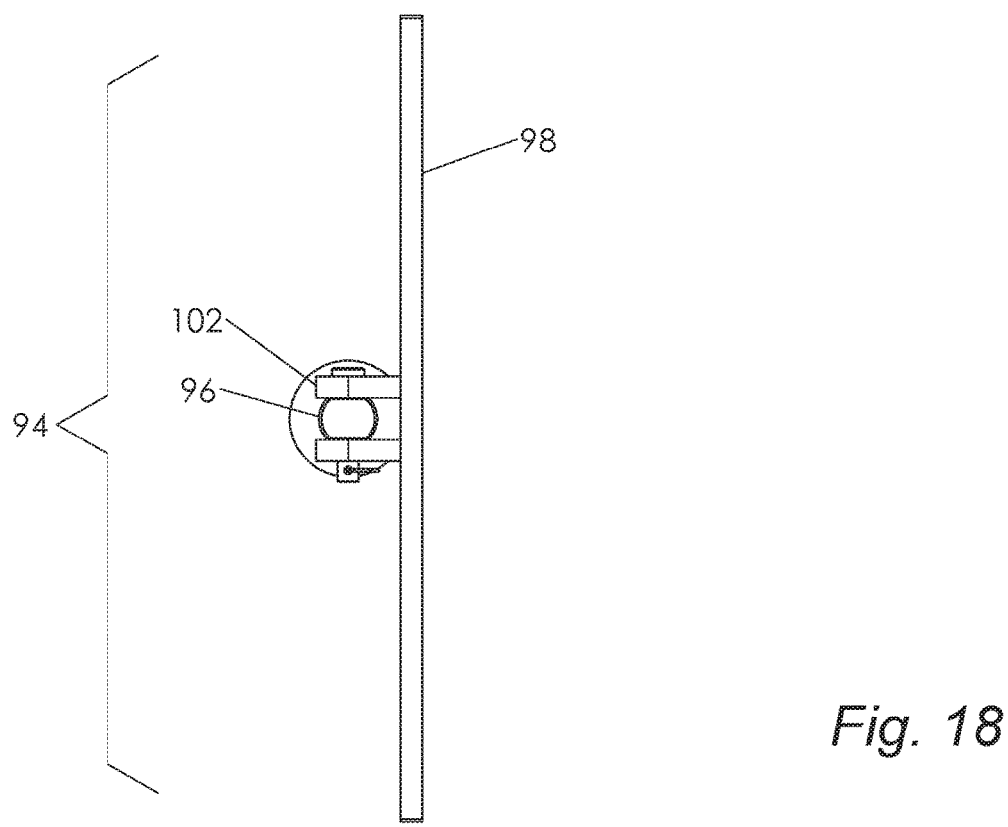
FIG. 18 is an end elevation of the door valve with attached push rod.
Figure 22:
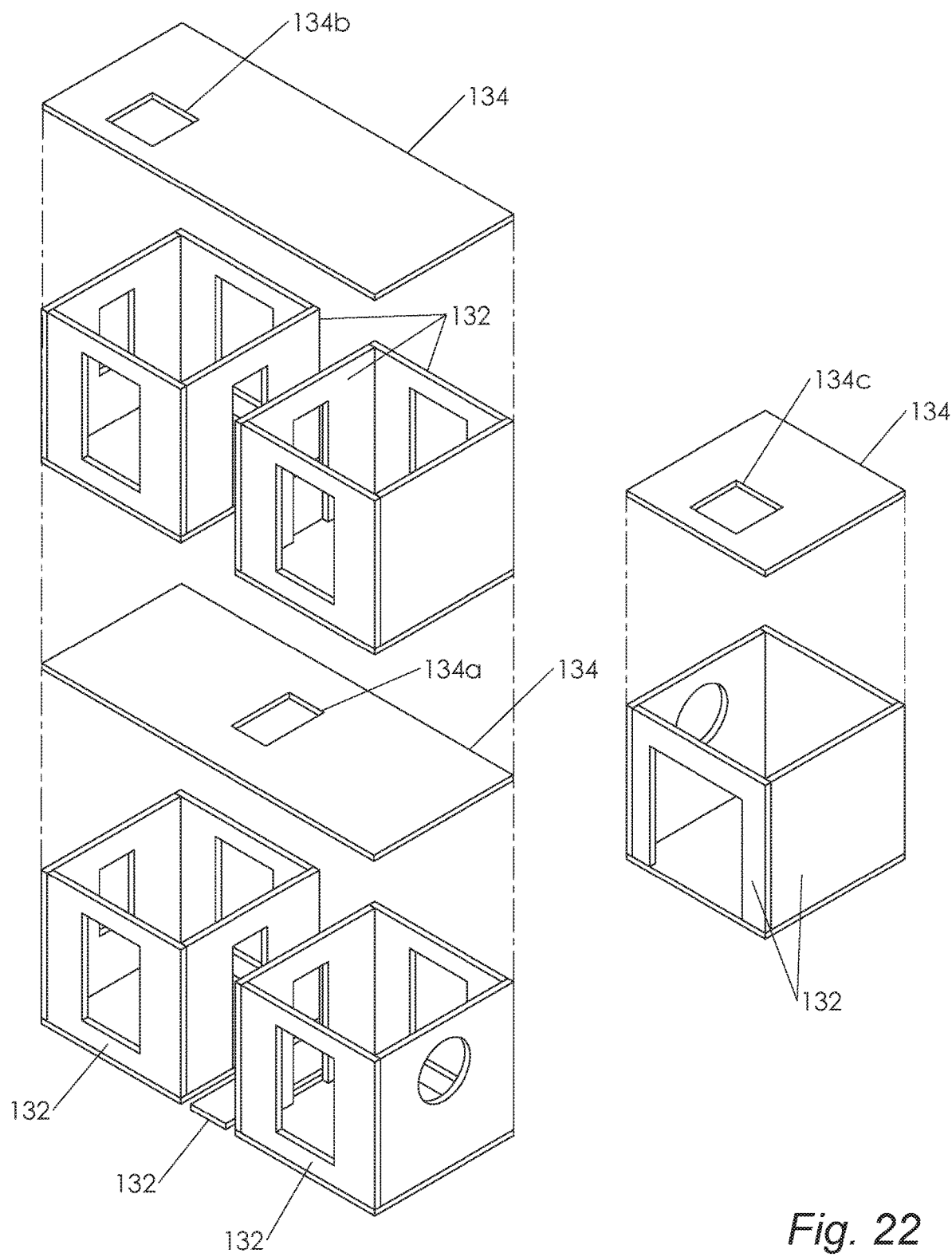

For a burn demonstration, pieces of ½ inch oriented strand board 132 or other similar burnable material are installed on the floor and butt fitted along the walls of burn chambers 50a, 50b, 72a, 72b and garage base 104. A representative arrangement of boards 132 for a fully charged burn demonstration with a two story building is illustrated in FIG. 22. For other burn demonstrations, however, less than a full charge may be used. For example, just garage base 104 may be lined with burnable material or just one or both burn chambers on the first story for a single story or two story building, etc. As illustrated in FIG. 22, a top plate 134 formed of strand board is installed along a top edge of strand boards lining the walls of first story 12, second story 14 and garage 18. The strand boards are recessed slightly below the top of the metal walls such that top plate 134 sits proud of the metal walls (as shown in FIG. 14) to block airflow when first story 12, second story 14 and roofs 16, 20 are stacked. With continuing reference to FIG. 22, top plate 134 is positioned over hallway 52 in first story 12 includes an aperture 134a for use in demonstrating the burn consequence of opening outside door 54 or aperture 86 in roof 16 as described below. Aperture 134a may also be used to show airflow in the stairway simulated when hallways 52 and 70 are stacked. Top plate 134 over second story 14 includes an aperture 134b over burn chamber 72a for demonstrating airflow through a two-story house when aperture 86 in roof 16 is opened. In like manner, top plate 134 in garage base 104 includes aperture 134c for demonstrating the burn consequence of opening an aperture in roof 20.

In use, burnable material is inserted into all of the burn areas or just those which are required for a particular demonstration. For a two story burn, second story 14 is stacked on first story 12 and roof 16 stacked on second story 14. If only a single story demonstration is wanted, roof 16 is stacked on first story. For both single and two story burns, roof 20 is stacked on garage base 104. To facilitate stacking, alignment tabs 136 are provided along the lower edge of second story 14 and gables 90 of main unit roof 16 and garage roof 20.

Figure 19:
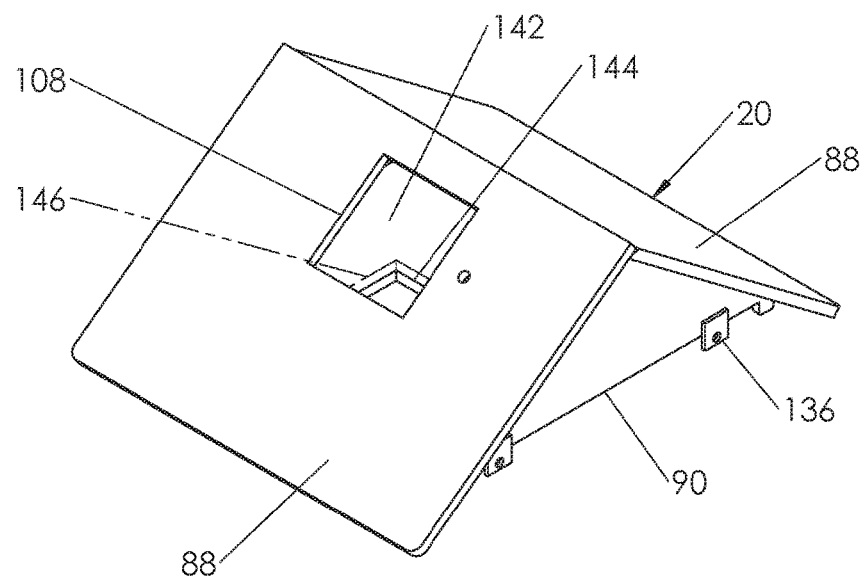
FIG. 19 is a perspective view of a roof for attachment to a garage base.
Figure 20:
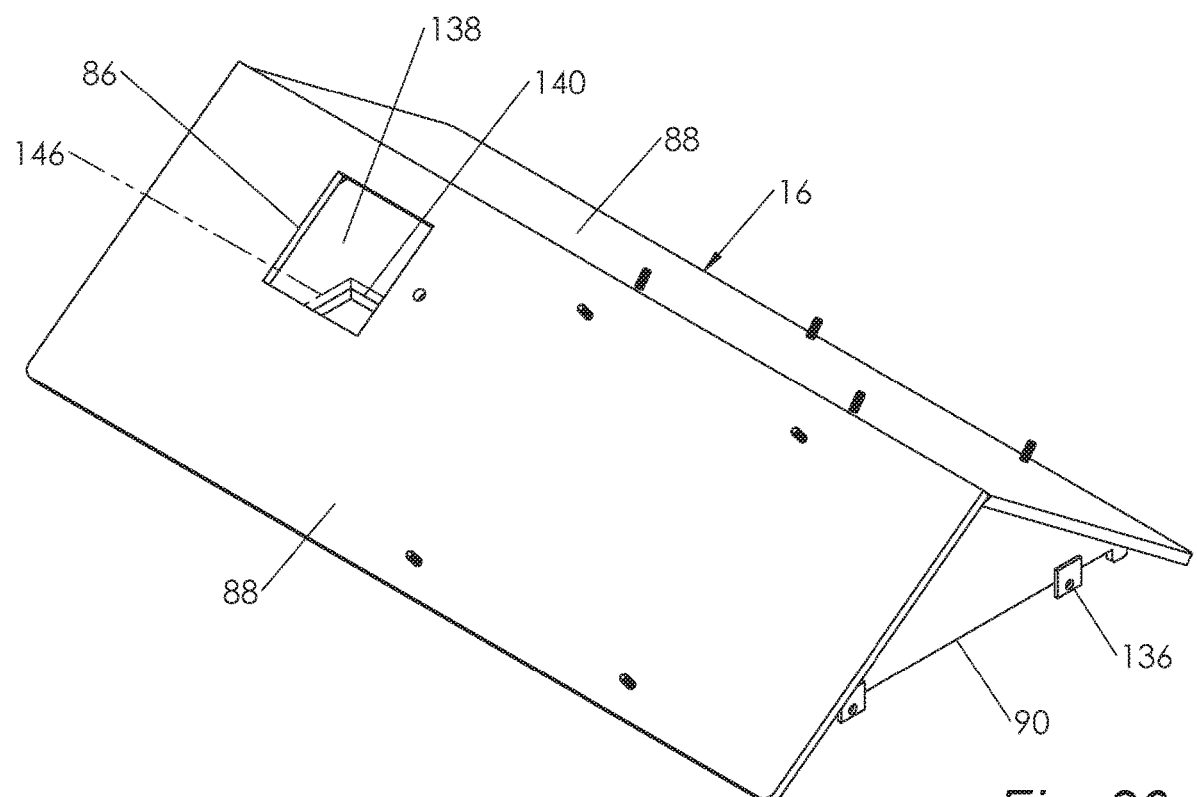
FIG. 20 is a perspective view of a roof for attachment to either a first or second story; and, FIG. 21 is perspective view of a portable mobile stand; and, FIG. 22 is an exploded perspective view of strand boards lining the garage base and a strand board top plate for use in a burn demonstration.

Turning to FIGS. 19 and 20, it is seen that gable ends 90 and pitched roof panels 88 are joined with a ceiling plate 138 with an aperture 140 in alignment with aperture 86 in roof 16. In like manner, the gables and pitched roof panels of roof 20 are joined with a ceiling plate 142 with an aperture 144 in alignment with aperture 108 in roof 20. During setup for a demonstration, apertures 140, 144 are blocked with a piece of wallboard 146 or the like, respectively, which may be punctured with a tool through apertures 86, 108 in roofs 16, 20, respectively, to simulate the fire consequences of opening roof ventilation. Each burn chamber may be further fueled with small strips of oriented strand board, pieces of carpet, shredded paper or the like. Some of the pieces of carpet, which simulate beds, couches and the like, may be wetted to demonstrate the benefit of applying water. It will be apparent to those skilled in the art that a large variety of burn scenarios may be demonstrated by opening selected ones of hinged window, door and roof closures 131, sliding door valves 94 and rotary valve 130.

After the burn chambers have been fueled as desired for the particular burn demonstration, roof 20 may be manually lifted and installed on garage base 104. Alignment tabs 136 assist in proper placement of roof 20 with aperture in ceiling plate 142 vertically aligned with aperture 134*c* in strand top plate 134. For a one story burn, a lifting bar (not shown) is attached along the ridge of roof 16. A cable is attached to a center eye on lifting bar and connected to lifting hoist 43 which includes a winch such that roof 16 may be lifted and installed on first story 12. Alignment tabs 136 assist in proper placement of roof 16 with aperture 86 facing the front of the unit. For a two story burn, a lifting clasp (not shown) with a center lifting eye is installed in doorways 92 of second story divider walls 84. A cable is attached to the lifting of eye of the clasp and to lifting hoist 43. Second story 14 is lifted and rotated such that push rods 96 face the backside of the unit and then seated with alignment tabs 136 on first story 12. Roof 16 may then be installed as described above for placement on first story 12.

With unit 10 positioned at eye level on portable mobile stand 24, the unit is uniquely suitable for thermal imaging of a burn and for teaching thermal imaging. Many fire fighting units have thermal imaging cameras but the fire fighters need to be trained how to use them. A thermal imaging camera allows a fire fighter to see how a fire looks through the lens of an infrared camera. Proper use of a thermal imaging camera improves decision making capabilities and allows the fire fighter to form the best plan of attack. Each camera is different and effective field use requires a comprehensive, hands-on introduction to thermal imaging and use of that particular camera. Unit 10 may be used in a field application lab that closely simulates real-world applications. With a burn in unit 10, a user may learn how to make accurate temperature readings with the camera and account for measurement effects such as distance and emissivity. The user may be trained to interpret thermograms and distinguish between hot spots and reflections. For this, unit 10 is an excellent piece of teaching equipment for use with thermal imaging equipment, such equipment being available even with very small, volunteer fire fighting units.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A fire fighting training unit with a stackable first story, second story and a roof, said roof being stackable on either the first story or second story to demonstrate a one-story or two-story burn, said first story having first and second burn units separated by first and second divider walls forming a hallway leading to an outside door, each of said divider walls having an aperture with a sliding door valve operated from outside the first story to control airflow through the aperture.

2. The fire fighting training unit of claim 1 wherein each of the sliding door valves comprises a gate slidable in tracks formed on a hallway side of the divider walls, a push rod attached to the gate and extending outside the first story.

3. The fire fighting training unit of claim 1 wherein said second story has first and second burn units separated by first and second divider walls forming a hallway, said hallway of the first story and said hallway of the second story simulating a stairway when the second story is stacked on the first story.

4. The fire fighting training unit of claim 3 wherein each of the divider walls in the second story has an aperture with a sliding door valve operated from outside the second story to control airflow through the aperture.

5. The fire fighting training unit of claim 4 wherein each of the sliding door valves of the second story comprises a gate slidable in tracks formed on a hallway side of the divider walls, a push rod attached to the gate and extending outside the second story.

6. The fire fighting training unit of claim 5 wherein window apertures are formed in the first and second burn units in each of the first and second story, each of said window apertures outfitted with a hinged closure with a latch.

7. The fire fighting training unit of claim 1 wherein the roof comprises pitched roof panels and end gables connected to a ceiling plate, one of said roof panels having an aperture aligned with an aperture formed in the ceiling plate, said aperture in the roof panel outfitted with a hinged closure and a latch.

8. A fire fighting training unit with a stackable first story, second story and a roof, said roof being stackable on either the first story or second story to demonstrate a one-story or two-story burn, a garage connected to the first story with a breezeway, a sleeve in the breezeway connecting an aperture in the first story with an aperture in the garage and a rotary valve in the sleeve for controlling airflow through the sleeve.

9. The fire fighting training unit of claim 8 wherein the rotary valve comprises a transverse plug attached to a rotary shaft that passes through a floor of the breezeway.

10. The fire fighting training unit of claim 8 wherein the garage has a garage base and a stackable roof, said roof having pitched roof panels and end gables connected to a ceiling plate, one of said roof panels having an aperture aligned with an aperture formed in the ceiling plate, said aperture in the roof panel outfitted with a hinged closure and a latch.

11. The fire fighting training unit of claim 8 wherein said first story has first and second burn units separated by first and second divider walls forming a hallway leading to an outside door, each of said divider walls having an aperture with a sliding door valve operated from outside the first story to control airflow through the aperture.

12. The fire fighting training unit of claim 11 wherein each of the sliding door valves comprises a gate slidable in tracks formed on a hallway side of the divider walls, a push rod attached to the gate and extending outside the first story.

13. The fire fighting training unit of claim 11 wherein said second story has first and second burn units separated by first and second divider walls forming a hallway, said hallway of the first story and said hallway of the second story simulating a stairway when the second story is stacked on the first story.

14. The fire fighting training unit of claim 13 wherein each of the divider walls in the second story has an aperture with a sliding door valve operated from outside the second story to control airflow through the aperture.

15. The fire fighting training unit of claim 14 wherein each of the sliding door valves of the second story comprises a gate slidable in tracks formed on a hallway side of the divider walls, a push road attached to the gate and extending outside the second story.

16. The fire fighting training unit of claim 15 wherein window apertures are formed in the first and second burn units in each of the first and second story, each of said window aperture outfitted with hinged closure and a latch.

17. The fire fighting training unit of claim 8 wherein the roof comprises pitched roof panels and end gables connected to a ceiling plate, one of said roof panels having an aperture aligned with an aperture formed in the ceiling plate, said aperture in the roof panel outfitted with a hinged closure and a latch.

18. The fire fighting training unit of claim 8 wherein at least one of the first and second burn units of the first and second story and the garage base have walls and a floor lined with strand boards, said strand board along the walls being shorter than the walls, said strand boards along the walls topped with a top strand board that sits proud of the walls.

* * * * *